ABSTRACT OF THE DISCLOSURE

Compounds having the formula

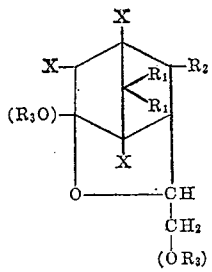

where X is chlorine or bromine, $R_1$ and $R_2$ taken together is ethylene dioxy, $R_2$ is hydrogen, chlorine or $CH_2OH$ and $(R_3O)$ is lower primary alkoxy, lower primary alkenoxy, or hydroxyl substituted lower primary alkoxy are prepared by reacting compounds having the formula:

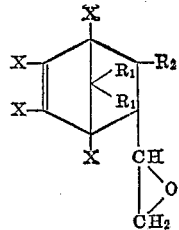

with alcohols in the presence of a base. These compounds are useful as pesticides as well as having many other uses.

---

This invention relates to novel 8-oxatricyclo-[2.2.1.2$^{3,5}$] nonanes and to a method of their preparation.

More particularly, this invention relates to the reaction of compounds corresponding to the formula:

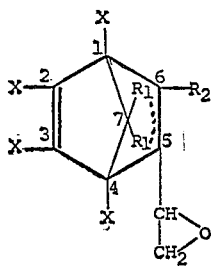

where X is selected from the group consisting of chlorine and bromine, $R_1$ is selected from the group consisting of chlorine, bromine, alkoxy and $R_1$ and $R_1$ taken together is ethylenedioxy, and $R_2$ is selected from the group consisting of hydrogen, chlorine, lower alkyl and —$CH_2OH$. Upon reaction of these compounds with alcohols in the presence of base, compounds are produced corresponding to the formula:

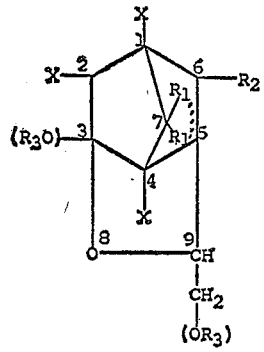

where X, $R_1$ and $R_2$ are defined above and where $(R_3O)$- is the moiety of the alcohol coreacting, that is, the radical obtained by removing a hydroxyl hydrogen atom from said alcohol.

The novel compounds of this invention include those compounds having the formula:

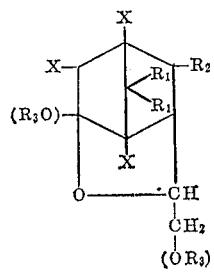

where X is selected from the group consisting of chlorine and bromine, $R_1$ and $R_1$ taken together is ethylene dioxy, $R_2$ is selected from the group consisting of hydrogen, chlorine, and $CH_2OH$ and $(R_3O)$ is selected from the group consisting of alkoxy, alkenoxy, and hydroxyl-substituted alkoxy. Examples of the novel compounds of this invention include the following:

1,2,4,-trihalo-3-organo-7,7-ethylenedioxy-9-organomethyl-8-oxatricyclo[2.2.1.2$^{3,5}$]nonanes 1,2,4-trihalo-3-organo-6-hydroxymethyl-7,7-ethylenedioxy-9-organomethyl-8-oxatricyclo[2.2.1.2$^{3,5}$]nonanes 1,2,4-trihalo-3-organo-6-lower alkyl-7,7-ethylenedioxy-9-organomethyl-8-oxatricyclo[2.2.1.2$^{3,5}$]nonanes wherein the halogen atoms are selected from the class consisting of chlorine and bromine, and where the 3-organo and 9-organo groups are a lower primary alkoxyl radical such as methoxy, ethoxy, butoxy, hexoxy and lower primary alkenoxy radicals such as allyloxy, 3-butenoxy and 5-hexenoxy, hydroxy lower primary alkoxy radicals, such as 2-hydroxyethoxy, 2-hydroxybutoxy and 4-hydroxyhexanoxy, or a dihydroxy-lower primary alkoxy radical such as 2,2-bis(hydroxymethyl)propoxy.

Specific examples of such compounds include:

1,2,4-trichloro-3-methoxy-7,7-ethylenedioxy-9-methoxymethyl-8-oxatricyclo[2.2.1.2$^{3,5}$]nonane 1,2,4-trichloro-3-ethoxy-7,7-ethylenedioxy-9-ethoxymethyl-8-oxatricyclo[2.2.1.2$^{3,5}$]nonane 1,2,4-trichloro-3-propoxy-7,7-ethylenedioxy-9-propoxymethyl-8-oxatricyclo[2.2.1.2$^{3,5}$]nonane 1,2,4-trichloro-3-pentoxy-7,7-ethylenedioxy-9-pentoxymethyl-8-oxatricyclo[2.2.1.2$^{3,5}$]nonane 1,2,4-tribromo-3-hexoxy-7,7-ethylenedioxy-9-hexoxymethyl-8-oxatricyclo[2.2.1.2$^{3,5}$]nonane 1,2,4-trichloro-3-methoxy-6-hydroxymethyl-7,7-ethylene-
  dioxy-9-methoxymethyl-8-oxatricyclo[2.2.1.2$^{3,5}$]
  nonane
1,2,4-trichloro-3-ethoxy-6-hydroxymethyl-7,7-ethylene-
  dioxy-9-ethoxymethyl-8-oxatricyclo[2.2.1.2$^{3,5}$]
  nonane
1,2,4-trichloro-3-butoxy-6-hydroxymethyl-7,7-ethylene-
  dioxy-9-butoxymethyl-8-oxatricyclo[2.2.1.2$^{3,5}$]
  nonane
1,2,4-tribromo-3-methoxy-6-hydroxymethyl-7,7-ethylene-
  dioxy-9-methoxymethyl-8-oxatricyclo[2.2.1.2$^{3,5}$]
  nonane
1,2,4-tribromo-3-hexoxy-6-hydromethyl-7,7-ethylene-
  dioxy-9-hexoxymethyl-8-oxatricyclo[2.2.1.2$^{3,5}$]
  nonane The starting materials corresponding to Formula I, above, are prepared by use of the Diels-Alder reaction employing butadiene monoxide or a substituted butadiene monoxide such as 1,2-epoxy-4-lower alkyl-3-butene, 1,2-epoxy - 4 - hydroxymethyl-3-butene or 1,2-epoxy-4-chloro-3-butene as the dienophile and a hexahalocyclopentadiene, a 5,5-dialkoxy-1,2,3,4-tetrahalocyclopentadiene or a 5,5-ethylenedioxy-1,2,3,4- tetrahalocyclopentadiene as the diene, depending on the products desired. The adducts are, respectively:

a 1,2,3,4,7,7-hexahalo-2-bicyclo[2.2.1]heptene-5-
  yloxirane
a 1,2,3,4-tetrahalo-7,7-dialkoxy-2-bicyclo[2.2.1]-
  heptene-5-yloxirane
a 1,2,3,4-tetrahalo-7,7-ethylenedioxy-2-bicyclo[2.2.1]-
  heptene-5-yloxirane
a 1,2,3,4,7,7-hexahalo-6-lower alkyl-2-bicyclo[2.2.1]-
  heptene-5-yloxirane
a 1,2,3,4-tetrahalo-6-lower alkyl-7,7-dialkoxy-2-
  bicyclo[2.2.1]heptene-5-yloxirane
a 1,2,3,4-tetrahalo-6-lower alkyl-7,7-ethylenedioxy-2-
  bicyclo[2.2.1]heptene-5-yloxirane
a 1,2,3,4,7,7-hexahalo-6-hydroxymethyl-2-bicyclo[2.2.1]-
  heptene-5-yloxirane
a 1,2,3,4-tetrahalo-6-hydroymethyl-7,7-dialokoxy-2-
  bicyclo[2.2.1]heptene-5-yloxirane
a 1,2,3,4-tetrahalo-6-hydroxymethyl-7,7-ethylenedioxy-2-
  bicyclo[2.2.1]heptene-5-yloxirane
a 1,2,3,4,7,7-hexahalo-6-chloro-2-bicyclo[2.2.1]-
  heptene-5-yloxirane
a 1,2,3,4-tetrahalo-6-chloro-7,7-dialkoxy-2-bicyclo-
  [2.2.1]heptane-5-yloxirane
a 1,2,3,4-tetrahalo-6-chloro-7,7-ethylenedioxy-2-bicyclo-
  [2.2.1]heptane-5-yloxirane The general preparation of compounds of the type set forth in the foregoing paragraph is described in Norton, Chemical Reviews, 31 (1941), pages 310–523, and Ungnade et al., Chemical Reviews, 58 (1958), pages 249–320.

The products of this invention are prepared by reacting the above compound with an alcoholic base.

The base may be a hydroxide of an alkali metal or an alkaline earth metal such as potassium hydroxide, sodium hydroxide, calcium hydroxide, magnesium hydroxide, and the like, or an alkoxide such as one of the following:

Sodium methoxide          Potassium butoxide
Potassium ethoxide        Sodium pentoxide
Sodium propoxide The preferred base materials are the alkali metal hydroxides, and particularly potassium hydroxide and sodium hydroxide.

It is desirable to utilize at least one mole of base per mole of the compound reacted with the alcohol.

The alcohol employed may be a saturated or unsaturated primary alcohol of about 1 to about 10 carbon atoms. Specific examples of such alcohols include:

Methanol                  Propylene glycol
Ethanol                   Allyl alcohol
Heptanol                  Methallyl alcohol
Decanol                   Propane-1,1,1-trimethanol
2-propanol                1,3,5-heptanetroil
Ethylene glycol           1,3,5,7-decanetetraol The reaction conditions employed to produce the products of this invention vary widely. For example, the reaction can be carried out at ordinary room temperature (about 25° C.) although somewhat elevated temperatures may be used to induce faster rates of reaction. Preferably, the reaction is carried out between 50° C. and 200° C., depending upon the reactivity and stability of the particular reactants and products involved in the reaction. The reaction in some cases may conveniently be carried out at the reflux temperature of the system. At higher temperatures, a polymerization inhibitor may be utilized in order to increase the yield of desired product.

The proportion of reactants may vary widely, and, if desired, an excess of one of the reactants may be used as a solvent. Preferably, the reaction is conducted in the presence of an excess of an alcohol. The reaction may also be carried out in the presence of an inert polar solvent such as tetrahydrofuran, dimethylformamide, dimethyl sulfoxide, dimethyl ethane and the like.

The compounds of the invention may be recovered from the reaction mixture by conventional techniques known to the organic chemist. In some instances the products crystallize out of solution and may be purified by recrystallization with appropriate solvents. When a solvent is used in which the desired product is soluble, removal of the solvent by evaporation or vacuum distillation may render the product crystalline. This product may then be recrystallized, if desired. Where the reaction mixture is a low-boiling material, the products may be isolated by vacuum distillation and recrystallization. Other techniques, such as solvent extraction and chromatography, may also be employed to isolate the products of this invention.

There is set forth below an example which illustrates the method of producing the compounds of this invention and the manner in which such compounds were isolated and identified. This example is, of course, given by way of illustration only and should not be construed as limiting the invention to the particular details thereof. All parts and percentages set forth, as true throughout this specification, are by weight unless otherwise specified.

The compound of the example was identified by infrared spectra, ultraviolet spectra and elemental analysis, among other methods.

Example I.—1,2,4,7,7-pentachloro - 3 - methoxy-9-
  methoxymethyl-8-oxatricyclo-[2.2.1.2$^{3,5}$]nonane To a three-necked, one liter, round-bottom flask equipped with stirrer and thermometer, were added 50 parts (0.163 mole) of 1,2,3,4,7,7-hexachloro-2-bicyclo[2.2.1] heptene-5-yloxirane and 100 milliliters of methanol. To this refluxing solution was added a solution of 15.0 parts (0.227 mole) potassium hydroxide in methanol in small increments over a 10 minute period. The mixture was then refluxed for an hour. The product was filtered and the filtrate was evaporated to dryness under vacuum. The pot residue was extracted with toluene, filtered, and the filtrate evaporated to dryness again. The residue was distilled to give 48.5 parts of distillate of boiling point 116° C.–122° C./0.12 millimeter of mercury. The distillate was crystallized from ether-ligroin three times to yield 19.5 parts of one isomer of melting point 87° C.–88.5° C. This product was identified by infrared spectra.

Analysis.—Calculated for $C_{11}H_{14}Cl_5O_3$: C, 35.61%; H, 3.81%; Cl, 47.79%. Found: C, 36.01%; H, 3.79%; Cl, 47.76%.

The mother liquor contained two different compounds as shown by infrared analysis. Slow recrystallization from hexane yielded the two kinds of crystals. Lump crystals were hand picked and recrystallized several times from hexane to yield crystals of a 50° C.–56° C. melting point. These crystals were different from the first isomer, as shown by infrared analysis.

*Analysis.*—Calculated for $C_{11}H_{14}Cl_5O_3$: C, 35.61%; H, 3.81%; Cl, 47.79%. Found: C, 35.61%; H, 3.50%; Cl, 47.84%.

By substituting the proper starting compound for the compounds recited in the working example, the various compounds of the invention listed hereinabove may likewise be prepared, as well as other compounds which are not specifically disclosed.

The compounds of the instant invention find utility as pesticides, for example, as nematocides, fungicides, miticides and acaricides, as well as insecticides. They may be used in the conventional manner in solutions, emulsions, as wettable powders, or in granulated form.

The compounds of this invention may also be incorporated into polymers such as polyesters, polyurethanes, or polyepoxides, in order to improve the flame retardant properties of the polymers. The novel products containing OH groups may be reacted with polyisocyanates and polyanhydrides to give polymeric products useful in protective and decorative coatings.

Although specific examples of the invention have been set forth, it is not intended to limit the invention solely thereto.

I claim:
1. A compound of the formula:

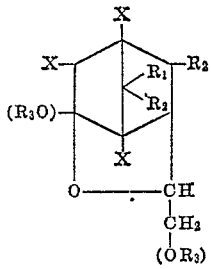

where X is selected from the group consisting of chlorine and bromine, $R_1$ and $R_2$ taken together is ethylenedioxy, $R_2$ is selected from the group consisting of hydrogen, chlorine and —$CH_2OH$, and ($R_3O$)— is selected from the group consisting of lower primary alkoxy, lower primary alkenoxy, and hydroxyl-substituted lower primary alkoxy.

2. A compound as in claim 1 which is 1,2,4-trihalo-3-organo - 7,7 - ethylenedioxy - 9 - organomethyl - 8 - oxatricyclo[2.2.1.2$^{3,5}$]nonane where the 3-organo and 9-organo groups are selected from the group consisting of lower primary alkoxy, lower primary alkenoxy, lower hydroxy-primary alkoxy and lower dihydroxy-primary alkoxy.

3. A compound as in claim 2 where the halogen is chlorine and the 3-organo and 9-organo groups are lower alkoxy.

4. A compound as in claim 1 which is 1,2,4-trihalo-3 - organo - 6 - hydroxymethyl - 7,7 - ethylenedioxy - 9-organomethyl-8-oxatricyclo[2.2.1.2$^{3,5}$]nonane where the 3-organo and 9-organo groups are selected from the groups consisting of lower primary alkoxy, lower primary alkenoxy, lower hydroxy-primary alkoxy and lower dihydroxy-primary alkoxy.

5. A compound as in claim 4 where the halogen is chlorine and the 3-organo and 9-organo groups are lower alkoxy.

6. A method of preparing a compound of the formula:

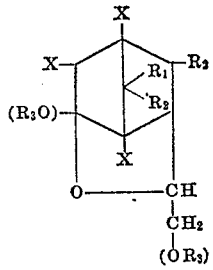

where X is selected from the group consisting of chlorine and bromine, $R_1$ is selected from the group consisting of chlorine, bromine, alkoxy and $R_1$ and $R_1$ taken together is ethylenedioxy, where $R_2$ is selected from the group consisting of hydrogen, chlorine, lower alkyl and —$CH_2OH$ and where ($R_3O$)— is selected from the group consisting of lower primary aloxy, lower primary alkenoxy and lower primary hydroxyl-substituted alkoxy, which comprises reacting a compound corresponding to the formula:

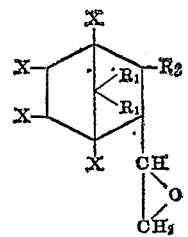

where X is selected from the group consisting of chlorine and bromine, $R_1$ is selected from the group consisting of chlorine, bromine, alkoxy and $R_1$ and $R_1$ taken together is ethylene dioxy, and $R_2$ is selected from the group consisting of hydrogen, chlorine, lower alkyl and —$CH_2OH$, with primary alcohols having from about 1 to about 10 carbon atoms in the presence of a base selected from the group consisting of alkali metal hydroxides, alkaline earth metal hydroxides and alkoxides.

7. A method of preparation, as in claim 6, where the reaction is carried out in the presence of excess alcohol.

References Cited
UNITED STATES PATENTS 3,331,860    7/1967    Hoch _____ 260—346.2
3,346,596    10/1967    Hoch _____ 260—346.2

ALEX MAZEL, Primary Examiner.

JAMES H. TURNIPSEED, Assistant Examiner.

U.S. Cl. X.R.

252—8.1; 260—2, 75, 77.5, 346.2, 348, 999

PO-1050
(5/69)

UNITED STATES PATENT OFFICE
CERTIFICATE OF CORRECTION

Patent No. 3,455,955      Dated July 15, 1969

Inventor(s) Wen-Hsuan Chang

It is certified that error appears in the above-identified patent and that said Letters Patent are hereby corrected as shown below:

Column 5, line 38, Claim 1, "$R_2$" should be $R_1$ as follows:

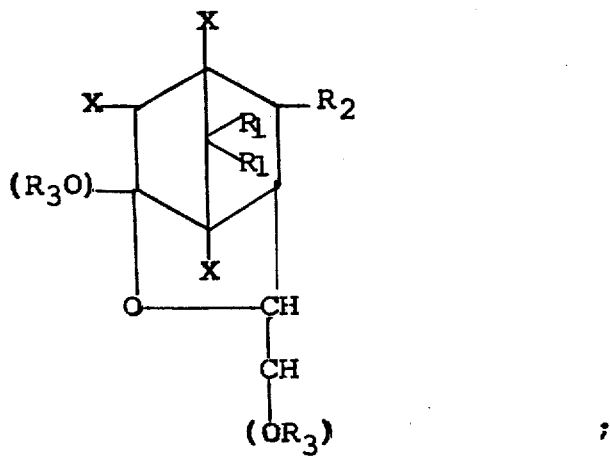

Column 6, line 13, Claim 6, "$R_2$" should be $R_1$ as follows:

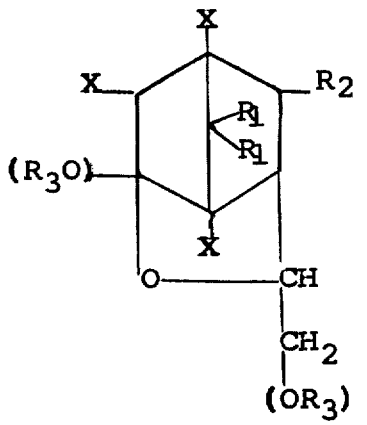

SIGNED AND SEALED
MAR 17 1970

(SEAL)
Attest:

Edward M. Fletcher, Jr.
Attesting Officer

WILLIAM E. SCHUYLER, JR.
Commissioner of Patents